(12) United States Patent
Schnitzler et al.

(10) Patent No.: US 10,146,037 B2
(45) Date of Patent: Dec. 4, 2018

(54) MICROSCOPE

(71) Applicant: LEICA MICROSYSTEMS (SCHWEIZ) AG, Heerbrugg (CH)

(72) Inventors: Harald Schnitzler, Lüchingen (CH); Robert Paulus, Hergatz (DE)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 15/516,706

(22) PCT Filed: Oct. 1, 2015

(86) PCT No.: PCT/EP2015/072660
§ 371 (c)(1),
(2) Date: Apr. 4, 2017

(87) PCT Pub. No.: WO2016/055337
PCT Pub. Date: Apr. 14, 2016

(65) Prior Publication Data
US 2017/0293128 A1    Oct. 12, 2017

(30) Foreign Application Priority Data

Oct. 6, 2014   (DE) .................. 10 2014 114 469

(51) Int. Cl.
*G02B 21/00*   (2006.01)
*G02B 21/02*   (2006.01)
*G02B 21/08*   (2006.01)
*G02B 21/12*   (2006.01)

(52) U.S. Cl.
CPC ....... *G02B 21/006* (2013.01); *G02B 21/0032* (2013.01); *G02B 21/0044* (2013.01); *G02B 21/02* (2013.01); *G02B 21/025* (2013.01); *G02B 21/082* (2013.01); *G02B 21/125* (2013.01)

(58) Field of Classification Search
CPC .. G02B 21/0032; G02B 21/006; G02B 21/02; G02B 21/04; G02B 21/0052; G02B 21/025; G02B 21/06
USPC ......................................... 359/389, 656–661
See application file for complete search history.

(56) References Cited

U.S. PATENT DOCUMENTS

| | | | | |
|---|---|---|---|---|
| 5,039,214 A | * | 8/1991 | Nagata ................... | G02B 21/00 359/386 |
| 5,907,400 A | * | 5/1999 | Aziz ........................ | G01B 9/04 356/511 |
| 6,043,932 A | * | 3/2000 | Kusunose ............ | G02B 21/002 359/368 |
| 6,219,189 B1 | | 4/2001 | Tomimatsu et al. | |
| 6,678,089 B1 | * | 1/2004 | Engelhardt ........ | G02B 21/0024 359/368 |

(Continued)

FOREIGN PATENT DOCUMENTS

| | | |
|---|---|---|
| DE | 4323129 A1 | 2/1994 |
| DE | 19914049 A1 | 10/2000 |

(Continued)

*Primary Examiner* — Jordan Schwartz
(74) *Attorney, Agent, or Firm* — Hodgson Russ LLP (57) ABSTRACT

A microscope (10) for detecting images of an object (14) located in an object plane (12) is described, comprising a microscope stand (18); a microscope objective (20); a light source (22) integrated into the microscope stand (18); and a beam splitter (24), integrated into the microscope objective (20), for coupling in a coaxial incident illumination.

14 Claims, 2 Drawing Sheets

(56) References Cited

U.S. PATENT DOCUMENTS

| | | | |
|---|---|---|---|
| 7,324,272 B1* | 1/2008 | Deck | G01J 3/02 |
| | | | 359/379 |
| 2003/0048530 A1* | 3/2003 | Sander | G02B 21/082 |
| | | | 359/389 |
| 2009/0040603 A1* | 2/2009 | Nagahama | G02B 21/02 |
| | | | 359/389 |
| 2010/0118297 A1* | 5/2010 | Liu | G02B 21/025 |
| | | | 356/237.5 |
| 2010/0284067 A1 | 11/2010 | Matsui | |
| 2011/0051261 A1 | 3/2011 | Ando et al. | |
| 2012/0050851 A1 | 3/2012 | Euteneuer et al. | |
| 2012/0062987 A1 | 3/2012 | Hnatkovich et al. | |

FOREIGN PATENT DOCUMENTS

| | | |
|---|---|---|
| DE | 102009037841 A1 | 2/2011 |
| DE | 102012223533 A1 | 6/2014 |
| EP | 2026115 A2 | 2/2009 |
| JP | 2003131139 A | 5/2003 |
| JP | 2004163555 A | 6/2004 |
| JP | 2005227371 A | 8/2005 |
| WO | 03009042 A2 | 1/2003 |
| WO | 03034124 A1 | 4/2003 |

* cited by examiner

FIG. 1

FIG. 2

MICROSCOPE

CROSS-REFERENCE TO RELATED APPLICATIONS

The present application is the U.S. national phase of International Application No. PCT/EP2015/072660 filed Oct. 1, 2015, which claims priority of German Application No. 10 2014 114 469.4 filed Oct. 6, 2014, the entire disclosure of which is incorporated herein by reference.

FIELD OF THE INVENTION

The invention relates to a microscope for detecting images of an object located in an object plane.

BACKGROUND OF THE INVENTION

A system having objectives, and having coaxial illumination integrated into the microscope body, is known from the existing art, contrasting adapters being located in the microscope body. The known system encompasses a zoom microscope in which the coaxial illumination infeed is located between the objective and zoom body. The objectives can be exchanged.

Also known from the existing art is an incident light axis for compound microscopes which is positioned between the objective or objective turret and an observation tube.

Also known from the existing art is a modular, coaxial illumination system for a microscope which is positioned between the objective and zoom. This known coaxial module is used in particular for bright-field coaxial illumination in stereo microscopes.

The known systems for microscope illumination have the disadvantage, however, that a separate illumination module is positioned above the objective between the zoom and the objective. In addition, in order to carry out polarization microscopy and to suppress an intrusive bright background in the image, a lambda/4 plate must be mounted as a separate component beneath the objective. Because of this positioning of the separate illumination module or lambda/4 plate as a separate component, more space is required in the observation beam path of the microscope. The known systems are therefore not optimized in terms of their overall height. The construction of the known systems, having the separate illumination module or the lambda/4 plate as a separate module, is furthermore relatively complicated. The constituents of the separate illumination module are furthermore not specific for different objectives. The image quality of the overall system is thereby decreased, since the illumination module must be designed for all usable objectives. A further disadvantage of the known systems is that the clear working distance (i.e. the open space between the objective and object plane) that can be used for manipulation of the object is not optimized.

SUMMARY OF THE INVENTION

Proceeding from the known existing art, the object of the invention is to describe a microscope for detecting images of an object located in an object plane, which microscope is characterized by a low overall height, a maximized clear working distance, simple construction, and high image quality.

This object is achieved by a microscope having the features described herein. Advantageous refinements are also described herein.

The low overall height, maximized clear working distance, simple construction, and high image quality are achieved by way of a microscope having a beam splitter integrated into the microscope objective, for coupling in a coaxial incident illumination.

The beam splitter integrated into the microscope objective is arranged in an observation beam path between the object plane and the image plane, and in an illumination beam path between the light source and the object plane, in such a way that the light generated by the light source is deflectable onto the object located in the object plane. Preferably the observation beam path and the illumination beam path are at least in part coaxial. Coaxial illumination for the microscope can thereby be implemented. In addition, a low overall height, optimized clear working distance, simple construction, and high image quality can be achieved for the microscope thanks to the arrangement of the beam splitter, integrated into the microscope objective, in the observation and illumination beam paths.

The image plane can be the intermediate image plane of a visual microscope, i.e. a conventional one equipped with a tube, or the acquisition plane of an image capture unit, for example an image sensor, of a digital microscope. The coaxial incident illumination corresponds to illumination of the object from above with light coupled in laterally, the light source for illumination being arranged above the object plane. In addition, the observation beam path and the illumination beam path are at least in part coaxial.

It is advantageous if the beam splitter is embodied in such a way that the light generated by the light source is coupled into the observation beam path. Preferably the beam splitter is arranged relative to the light source in such a way that the light generated by the light source is coupled laterally into the observation beam path, and the light coupled laterally into the observation beam path is deflected onto the object located in the object plane. Lateral incoupling of the light generated by the light source can thereby be implemented for coaxial illumination for the microscope.

A field diaphragm and an aperture diaphragm are preferably arranged in the illumination beam path between the light source and the object plane, in a portion of the microscope stand facing toward the microscope objective, in such a way that a Köhler condition for illumination of the object is satisfied. Köhler illumination of the object located in the object plane can thereby be achieved.

Alternatively thereto, the light source is imaged into a field plane and through the microscope objective into the object plane, so that critical illumination of the object is achieved. Critical illumination of the object located in the object plane can thereby also be achieved instead of Köhler illumination.

According to a particularly preferred embodiment, it is advantageous if a lambda/4 plate is arranged between several objective lenses arranged after the beam splitter in the illumination direction, and if the lens surfaces of the objective lenses that are arranged after the lambda/4 plate in the illumination direction are embodied in such a way that light reflected at them is deflected substantially out of the observation beam path. As a result, objective lenses having a high refractive power can be arranged at that end of the microscope objective which faces toward the object plane.

The lambda/4 plate is located in particular in that part of the objective which is used jointly both by the illumination beam path and by the observation beam path.

It is furthermore advantageous if the microscope is characterized by a refractive element integrated into the microscope objective, a portion of the microscope objective facing toward the object plane being arranged in the observation beam path between the object plane and the image plane, and in the illumination beam path between the light source and the object plane, the refractive element integrated into the microscope objective being arranged in front of the beam splitter in the illumination direction, and in the illumination beam path between the light source and the object plane in a portion of the microscope objective facing toward the light source, in such a way that the illumination aperture corresponds to the objective aperture of the microscope objective. As a result, the illumination aperture can be adapted individually with no need for a complex arrangement for coaxial illumination. A refractive element individually adaptable to the microscope objective also allows the homogeneity of the illumination in the object field to be optimized.

A contrasting element is preferably arranged in the microscope objective. The result is that, for example, oblique illumination of the object located in the object plane can be achieved.

It is furthermore advantageous if the microscope is characterized by an interface, integrated into the microscope objective, for inserting different contrasting elements. As a result, the contrasting elements can be flexibly adapted to the respective microscope objective, or differently configured contrasting elements can be introduced into the illumination beam path.

The microscope objective is preferably a removable microscope objective that is mountable on and demountable from the microscope stand.

According to further exemplifying embodiments, a microscope objective is furnished. The microscope objective encompasses a microscope objective housing; several objective lenses arranged in the objective housing; and at least one beam splitter, integrated into the objective housing, that is provided for incoupling of a coaxial incident illumination.

According to further exemplifying embodiments, a microscope system is furnished. The microscope system encompasses an exemplifying microscope; an exemplifying microscope objective encompassing a beam splitter; and at least one further, removable, beam-splitter-free microscope objective. The working distance and/or focal length is longer when the beam-splitter-free objective is mounted than when the objective encompassing the beam splitter is mounted.

The present invention overcomes in particular the following disadvantages of the known systems for microscope illumination: For low-magnification objectives, coaxial illumination is not necessary in the majority of cases. With the known systems, however, the beam splitter for coaxial illumination is fixedly connected to the zoom system, thereby preventing the overall system from being optimized for low-magnification objectives. It has been recognized that in particular with low-magnification objectives, benefit can be gained from the fact that the lenses are housed in the installation space normally occupied by the beam splitter for coaxial illumination. Because the outlay for aberration correction decreases for these low-refraction objectives, i.e. objectives having a long focal length, due to the smaller number of lenses, the working distance of such an objective can be extended. In addition, in the known systems a fixedly integrated beam splitter, which is characterized e.g. by a 50/50 splitting ratio, permanently results in less brightness at the detector for these low-magnification objectives. The necessary increase in the brightness of the light source produces a higher temperature at the site of the light source, and a higher illumination intensity at the site of the sample.

The present invention, conversely, enables optimization in terms of working distance by the fact that the beam splitter is integrated into the objective. It is thereby possible to achieve the maximum possible working distance. Thanks to the availability of an illumination option having a dedicated light source, with the present invention the brightness of the light source can be controlled independently of any second illumination that may be used simultaneously, for example a ring light. This is not possible with the known systems, because one light source is used therein for both types of illumination, i.e. ring light and coaxial illumination. In addition, the present invention prevents non-optimal operation of the microscope, because instead of coaxial illumination, a different illumination can be provided for low-magnification objectives.

The beam splitter cube can be pivoted out into the incident light axes of the known systems. This does prevent a higher illumination intensity, but once again the disadvantages just recited in terms of working distance are produced. In addition, while these known systems make possible contrasting or oblique illumination, these known systems are relatively complicated because the contrast unit, fixedly connected to the illumination axis, must cover in terms of its properties all the objectives provided for use in a microscope.

The present invention, conversely, enables fixed physical integration of the contrasting element into the objective. The exemplifying implementation has the advantage as compared with the existing art that the contrasting element can be adapted to the specific conditions of the objective, which results in improved contrasting performance. On the other hand, contrasting is typically not possible with the known systems having modular coaxial illumination.

BRIEF DESCRIPTION OF THE DRAWING VIEWS

Further features and advantages of the invention are evident from the description below, which explains the invention in further detail with reference to exemplifying embodiments in conjunction with the attached Figures, in which.

DETAILED DESCRIPTION OF THE INVENTION

Figure 1:
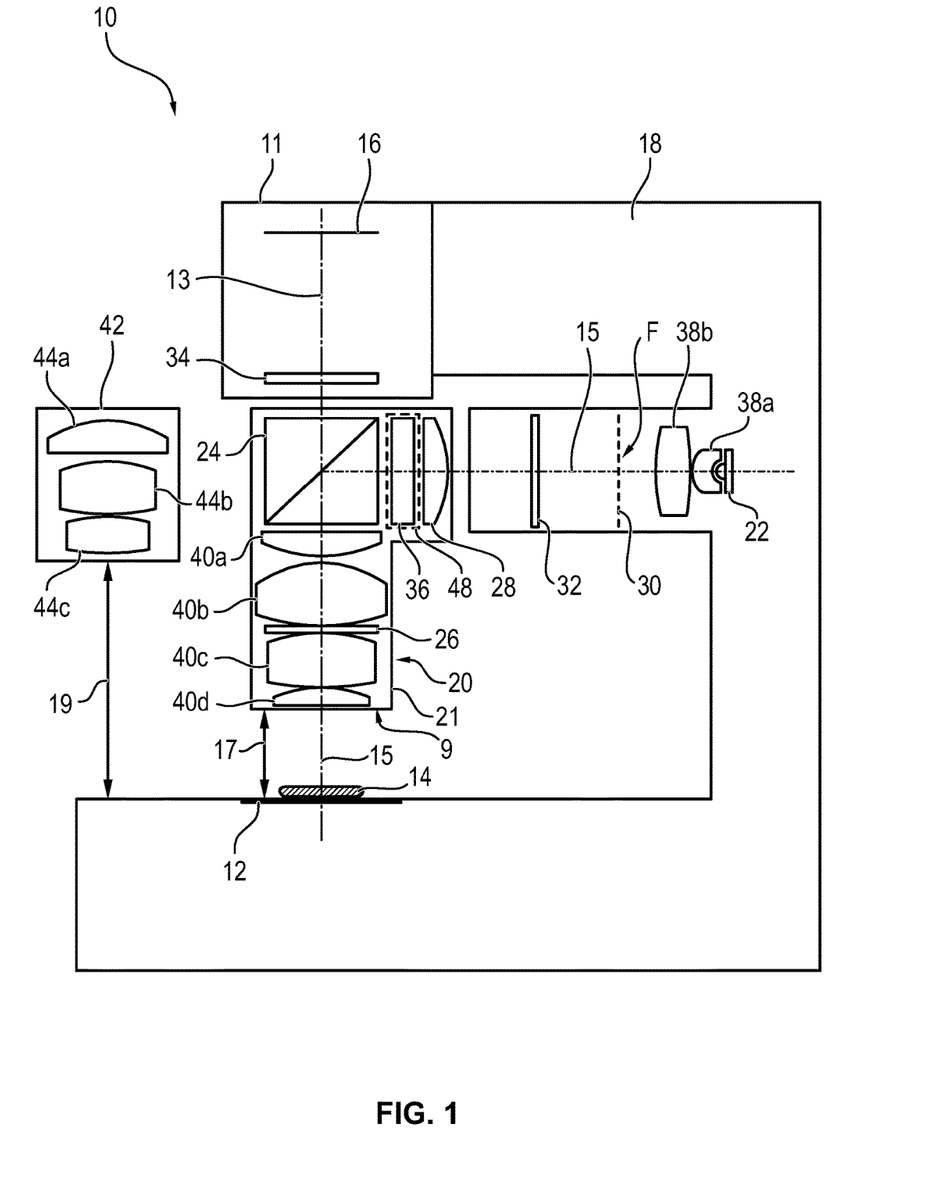
FIG. 1 schematically depicts an exemplifying microscope for detecting images of an object located in an object plane, having an image sensor.

FIG. 1 schematically depicts an exemplifying microscope 10, having an image sensor 16, for detecting images of an object 14 located in an object plane 12. Element 16 can also be assumed to be an intermediate image plane and thus an interface for a visual view into a microscope. As shown in FIG. 1, microscope 10 encompasses a microscope stand 18 and a microscope objective 20. Microscope stand 18 and microscope objective 20 represent two components, separate from one another, of microscope 10. Microscope 10 shown in FIG. 1 furthermore encompasses a light source 22 integrated into microscope stand 18. As shown in FIG. 1, image sensor 16 is a constituent of a detector 11 that is mounted on microscope stand 18. Alternatively, in a visual system a tube can also be provided. Image sensor 16 serves to detect two-dimensional images of object 14 located in object plane 12.

Also shown in FIG. 1 are the observation beam path between object plane 12 and image sensor 16, having axis 13, and the illumination beam path between light source 22 and object plane 12, having axis 15 at least in part coaxial with axis 13. The observation beam path and the illumination beam path are at least in part coaxial, the coaxial observation and illumination beam path being located perpendicularly to object plane 12. The illumination direction is defined as the direction of the light that is generated by light source 22 and propagates along illumination beam path 15 toward object plane 12.

As shown in FIG. 1, microscope objective 20 encompasses a portion facing toward light source 22 and a portion facing toward object plane 12. Microscope objective 20 furthermore encompasses an integrated beam splitter 24. Microscope objective 20 furthermore encompasses an integrated refractive element 28, which is arranged before beam splitter 24 in the illumination direction and in which that portion of microscope objective 20 which faces toward light source 22 is arranged. A contrasting element 36 is arranged between refractive element 28 and beam splitter 24. Microscope objective 20 furthermore encompasses an integrated lambda/4 plate 26 that is arranged after beam splitter 24 in the illumination direction and is arranged in that portion of microscope objective 20 which faces toward object plane 12. Lambda/4 plate 26 is arranged between several objective lenses 40a to 40d arranged after beam splitter 24 in the illumination direction. Objective lenses 40a, 40b are arranged before lambda/4 plate 26 in the illumination direction, while objective lenses 40c, 40d are arranged after lambda/4 plate 26 in the illumination direction. Working distance 17 corresponds to the distance between object plane 12 and end face 9, facing toward object plane 12, of microscope objective 20.

Microscope stand 18 encompasses a portion facing toward microscope objective 20. This portion of microscope stand 18 which faces toward microscope objective 20 encompasses optical elements 38a, 38b that are arranged after light source 22 in the illumination direction, and a field diaphragm 30 that is arranged after optical elements 38a, 38b in the illumination direction. That portion of microscope stand 18 which faces toward microscope objective 20 also encompasses a polarizer 32 that is arranged after field diaphragm 30 in the illumination direction. In addition, an analyzer 34 is arranged in observation beam path 13 between object plane 12 and image sensor 16, after beam splitter 24 in the light flow direction. Analyzer 34 is a constituent of detector 11 mounted on microscope stand 18.

The position of polarizer 32 shown in FIG. 1 is, by way of example, in stand 18. The polarizer can also be integrated into the objective. The analyzer can also be integrated into the stand rather than into the detector unit.

In addition to microscope objective 20, microscope 10 encompasses a further, beam-splitter-free microscope objective 42 having several objective lenses 44a to 44c. The microscope system shown in FIG. 1 encompasses in particular microscope objective 20 encompassing beam splitter 24, and the further, beam-splitter-free microscope objective 42. Microscope objectives 20, 42 are each removable microscope objectives. In addition, the focal length and/or working distance 19 is longer when beam-splitter-free objective 42 is mounted than when objective 20 encompassing beam splitter 24 is mounted.

For the case in which further microscope objective 42 is arranged in observation beam path 13 between object plane 12 and image sensor 16, a transmitted-light illumination, oblique illumination, or ring-light illumination is provided in microscope 10 alternatively or in addition to incident illumination. This alternative or additional illumination is not depicted in FIG. 1. The incident illumination is implemented by introducing microscope objective 20 into observation beam path 13 between object plane 12 and image sensor 16 in the manner depicted in FIG. 1.

With the arrangement shown in FIG. 1: light source 22 is a light-emitting diode (LED), optical elements 38a, 38b are special lenses for the illumination beam path, refractive element 28 is a planoconvex lens, and objective lenses 40a to 40d and 44a to 44c are lenses constituting an objective lens system of the respective microscope objective 20, 42.

Beam splitter 24 integrated into microscope objective 20 serves for lateral incoupling into observation beam path 13 of the light generated by light source 22. In addition, the light incoupled laterally into observation beam path 13 is deflected, using beam splitter 24, onto object 14 located in object plane 12. The fact that beam splitter 24 for incoupling the coaxial light into observation beam path 13 is integrated into microscope objective 20 makes possible an optimization of the overall system in terms of working distance. The light referred to as "coaxial light" is the light, coupled into the observation beam path, that is deflected onto object 14 located in object plane 12. Objectives that do not require a coaxial beam splitter, such as further microscope objective 42 shown in FIG. 1, can be implemented with a longer working distance and/or longer focal length, i.e. a greater variation in the magnification factor. The limited installation space for those objectives can thereby advantageously be utilized. In particular, an objective that (like microscope objective 42) does not require a beam splitter can be implemented in weight-optimized fashion and with less volume. This is advantageous for the user in that, inter alia, when such a microscope system is used on a tilting stand, the sample, for example a circuit board having tall components, can occupy a considerably larger volume without having the sample collide with the objective upon tilting.

Field diaphragm 30, arranged after light source 22 in the illumination direction, serves to furnish Köhler illumination of object 14 located in object plane 12. Field diaphragm 30 is arranged in such a way that the so-called "Köhler condition" for illumination of object 14 is satisfied. In order to provide different microscope objectives with light for full illumination of the object field, the coaxial beam path, i.e. the at least in part coaxial observation and illumination beam path, should satisfy the conditions derivable from the Köhler illumination principle for imaging the pupils and windows. If a strict correlation exists between pupils and fields, the extent of the light spot in field plane F ensures that the field is completely illuminated out to the edge. The maximum extent of the light spot in the aperture diaphragm plane determines the maximum illumination angle in the object. This illumination angle should be selected so that the beam reflected at the object is transmitted along the observation path to the detector (eye or camera).

So-called "critical illumination" can also be implemented in the coaxial beam path. Here light source 22 is imaged into a field plane F and, with microscope objective 20 or 42, into the vicinity of object plane 12, also referred to as a "specimen plane". If the structure of the light proceeding from light source 22 is to be destroyed, this can occur, individually and specifically for each microscope objective, by frosting optical surfaces in that portion of microscope objective 20 (also referred to as the "illumination portion") which faces toward light source 22.

Figure 2:
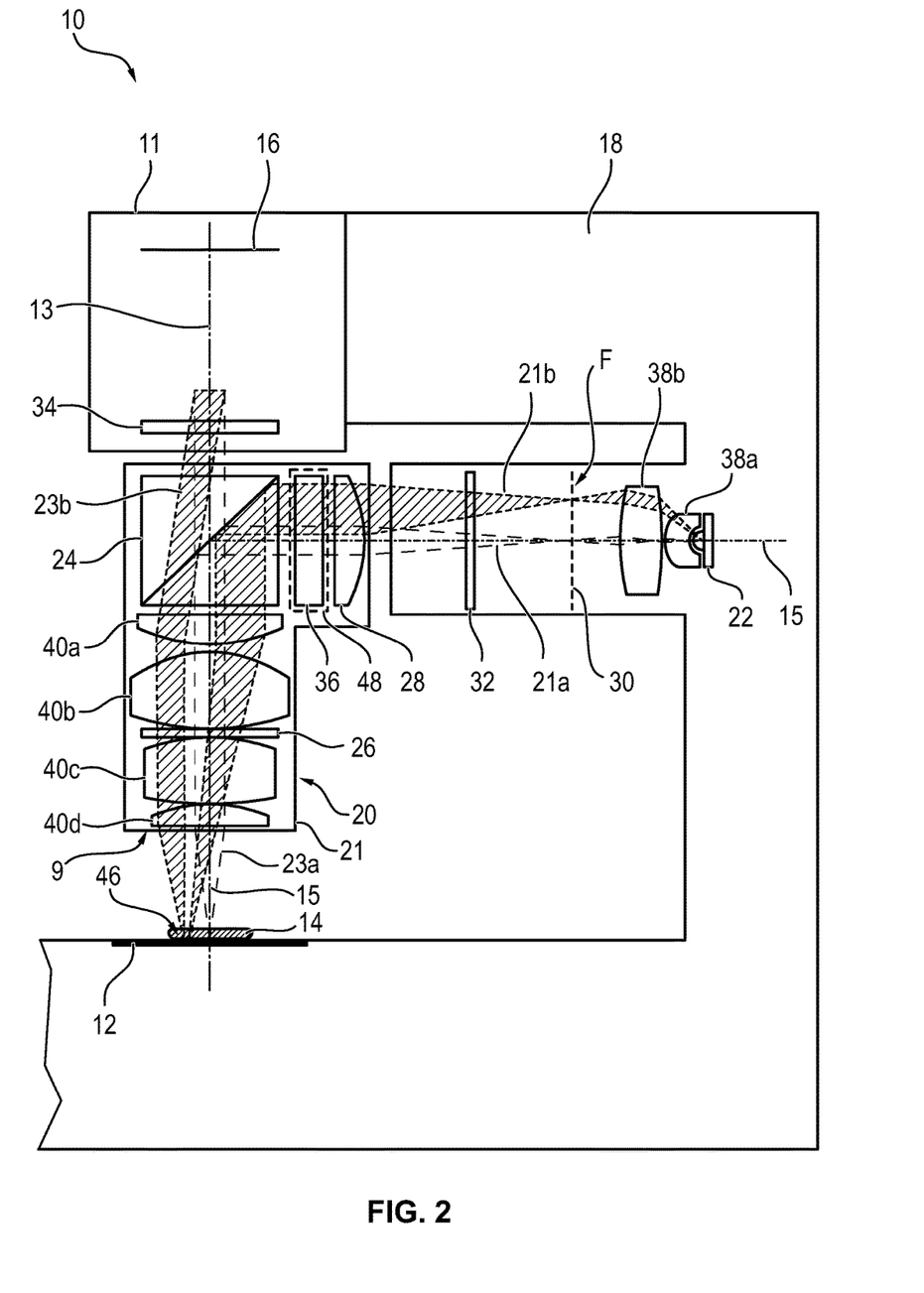
FIG. 2 schematically depicts the exemplifying microscope according to FIG. 1 with imaging beam paths to illustrate critical illumination of the object.

FIG. 2 schematically depicts the exemplifying microscope 10 according to FIG. 1 with imaging beam paths 21a, 21b to illustrate critical illumination of the object. The object 14 located in object plane 12 is depicted in FIG. 2. Imaging beam paths 21a, 21b shown in FIG. 2 refer respectively to central rays and marginal rays of the light proceeding from light source 22.

Optical elements 38a, 38b arranged after light source 22 in the illumination direction are used to image light source 22 into field plane F and onto object plane 12.

After reflection at object 14 located in object plane 12, the corresponding beam paths 23a, 23b are produced for the reflected beams reflected toward detector 11. In particular, imaging beam paths 21a, 21b are depicted only schematically in FIG. 2. The reflected beam paths are also not depicted all the way to image sensor 16 of detector 11.

Lambda/4 plate 26 integrated into microscope objective 20 serves to influence the polarization direction of the light passing through lambda/4 plate 26. Polarizer 32 and analyzer 34 are furthermore embodied as crossed polarizers; in other words, the passthrough direction of analyzer 34 is rotated 90° with respect to the polarization direction generated by polarizer 32. Polarizer 32, lambda/4 plate 26, and analyzer 34 result in improved bright-field polarization microscopy. Improved bright-field polarization microscopy is achieved in particular by attaching and appropriately orienting lambda/4 plate 26. In addition, dark-field polarization microscopy can also be implemented by removing or rotating lambda/4 plate 26, lambda/4 plate 26 being rotated 45° as compared with the position for bright-field polarization microscope.

In order to implement improved bright-field polarization microscopy, polarizer 32, lambda/4 plate 26, and analyzer 34 are configured in such a way that the polarization direction of the light that is reflected at object 14 located in object plane 12, and passes through lambda/4 plate 26 in the direction of image sensor 16, and strikes analyzer 34, corresponds to the passthrough direction of analyzer 34. The polarization direction, established by polarizer 32, of the light that is generated by light source 22 and passes through lambda/4 plate 26 in the direction of object plane 12, after reflection at object 14 located in object plane 12 and passage again through lambda/4 plate 26 in the direction of image sensor 16, is rotated 90° with the aid of lambda/4 plate 26. Conversely, the polarization direction, effected by polarizer 32, of the light that is generated by light source 22, and is reflected at lens surfaces of objective lenses 40a, 40b arranged in front of lambda/4 plate 26 in the illumination direction, and strikes analyzer 34 after reflection, is not rotated. In addition, the lens surfaces of objective lenses 40c, 40d arranged after lambda/4 plate 26 in the illumination direction are so strongly curved that light reflected at them is deflected out of the observation beam path. The result is that only the light reflected at object 14 located in object plane 12, said light passing through lambda/4 plate 26 twice (i.e. in the illumination direction and in a direction opposite to the illumination direction), is allowed by analyzer 34 to pass, so that that light is detected by image sensor 16. The light reflected at the lens surfaces of objective lenses 40a to 40d, however, does not arrive at image sensor 16 of detector 11.

In particular with the arrangement shown in FIG. 1 of lambda/4 plate 26 between the several objective lenses 40a to 40d, the objective lenses 40c, 40d that are arranged after lambda/4 plate 26 in the illumination direction are objective lenses having a high refractive power. This has the advantage, in terms of optical design, that the refractive power of the objective lenses can be positioned at the lower end of microscope objective 20, and working distance 17 can thus be extended. This embodiment is advantageous in particular for objectives having high refractive power and thus strong radii of curvature in the lower lenses.

Alternatively to the arrangement shown in FIG. 1, lambda/4 plate 26 is preferably arranged at that end of microscope objective 20 which faces toward object plane 20. In other words, in this case lambda/4 plate 26 is arranged after all the objective lenses 40a to 40d in the illumination direction. This prevents reflections from lens surfaces of all these objective lenses 40a to 40d from arriving at image sensor 16 of detector 11.

The exemplifying coaxial illumination prevents illuminating light, reflected at lens surfaces of objective lenses arranged in the observation beam path, from producing an intrusive bright background in the resulting image. This is prevented by introduction of the crossed polarizers, i.e. polarizer 32 and analyzer 34. Polarizer 32 arranged in the illumination beam path is oriented crosswise to analyzer 34 arranged in the observation beam path. No illumination light can therefore reach image sensor 16 as long as the polarization state of the light is not rotated.

According to a preferred exemplifying embodiment of the invention, two microscopy methods are made possible in particular. These are dark-field polarization microscopy and bright-field polarization microscopy.

In the preferred embodiment of dark-field polarization microscopy, the two polarizers 32, 34 are configured in such a way that all light is blocked if its polarization is not disturbed. In this application, polarization disturbance occurs only as a result of interference sites on an otherwise reflective specimen, so that the observer obtains a predominantly dark image with bright interference sites.

In the preferred embodiment of bright-field polarization microscopy, polarizer 32, lambda/4 plate 26, and analyzer 34 are configured in such a way that the light passes through lambda/4 plate 26 twice, i.e. through and back, with the result that the polarization direction of the returning light is rotated 90°. The observer then obtains a predominantly bright image, since the illuminating light that is reflected back from object 14 is rotated into the passthrough direction of analyzer 34.

The following advantages are obtained thanks to the provision of lambda/4 plate 26 as an integrated constituent of microscope objective 20: The clear working distance between objective and object can be extended. Optical image quality can be enhanced, since a lambda/4 plate does not need to be introduced below the objective, generating unavoidable spherical and chromatic aberrations. Even high-magnification and high-resolution objectives can be equipped with the integrated lambda/4 plate. In the embodiment in which the lambda/4 plate is arranged not as the lowest element but instead between the lens elements of the objective, reflections from the lens surface that follow below it can in principle once again be observed, but this embodiment has the advantage that it becomes possible to place the refractive power of the lenses at the lower end of the objective.

Preferably the lambda/4 plate is mounted rotatably. The ratio of polarization-receiving reflected light and non-polarization-receiving remitted light in the image can thereby be controlled. This allows the switchover between the bright-field and dark-field scenarios described above.

The lambda/4 plate is typically rotatable. Its effect on polarization can thus be adjusted arbitrarily. In particular, the polarizer or polarizing filter in the illumination beam path, and the analyzer in the observation beam path, are permanently preset at the factory at 90° to one another. In addition, the lambda/4 plate can be introduced at the aforesaid location, making it possible, after rotatable adjustment, for the light that is reflected back from the object to be rotated into the passthrough direction of the analyzer. If the lambda/4 plate is rotated 45° with respect to that active position, it then effectively does nothing, i.e. the light is blocked by the analyzer (as if no lambda/4 plate were introduced).

Refractive element 28 integrated into microscope objective 20 serves to adapt the illumination aperture to the objective aperture of microscope objective 20. Refractive element 28 is selected so that the illumination aperture for coaxial illumination corresponds to the objective aperture of microscope objective 20 respectively arranged in the observation beam path. There is thus no need for a complicated illumination arrangement for coaxial illumination of different objectives each having a different objective aperture. The fact that the illumination aperture corresponds respectively to the objective aperture of microscope objective 20 prevents a decrease in the resolution capability of the respective microscope objective 20. It is advantageous in this context that a portion of the optical system of the illumination branch, i.e. refractive element 28 arranged in that portion of microscope objective 20 which faces toward light source 22, is an integral constituent of the respective microscope objective 20. This portion is therefore exchanged along with the objective, and permits individual adaptation of the illuminating beams for each objective.

A refractive power defined individually for each objective with the aid of the integrated refractive element 28 furthermore makes it possible to carry out a specific adaptation of the coaxial beam path in such a way that, for example, homogeneity in object plane 12 is improved.

Oblique illumination can be implemented by introducing contrasting element 36 into the illumination beam path between refractive element 28 and beam splitter 24. The geometry of contrasting element 36 can encompass, for example, a sickle-shaped or round geometry, or a geometry having a straight edge. In particular, this geometry can be adapted to the conditions of the respective objective.

The exemplifying microscope 10 encompasses in particular: a beam splitter integrated into the objective for incoupling the illumination, and at least one refractive power, integrated into the objective, of the illuminating beam path; a contrasting element integrated permanently into the objective; an interface 48, integrated into the objective, for inserting various contrasting elements; or a lambda/4 plate integrated into the objective, the lambda/4 plate being rotatably mounted.

The preferred embodiment implements an illumination interface in a microscope. In particular, an illumination interface is furnished between the microscope stand and the object located in the object plane. The illumination interface corresponds here to the beam splitter integrated into the objective, the lambda/4 plate integrated into the objective, and the refractive element integrated into the objective. Simple and flexible adaptation of different objectives is made possible with the aid of the defined illumination interface, thanks to the physical separation of the illumination source and objective. The light source is integrated into the stand, which yields advantages in terms of heat dissipation since the thermal sensitive observation optics or objective are arranged physically, and thus thermally, in a manner clearly separated from the light source. The contrasting unit is integrated into the objective and can thus be specifically configured for the conditions in the objective.

PARTS LIST

10 Microscope
11 Detector
12 Object plane
13, 15 Axis of beam path
21a, 21b, 23a, 23b Beam path
14 Objective
16 Image sensor or image plane
17, 19 Working distance
18 Microscope stand
20, 42 Microscope objective
21 Microscope objective housing
22 Light source
24 Beam splitter
26 Lambda/4 plate
28 Refractive element
30 Field diaphragm
32 Polarizer
34 Analyzer
36 Contrasting element
38a, 38b Optical elements
40a to 40d, 44a to 44c Objective lenses
46 Field margin
48 Contrasting element interface
F Field plane

What is claimed is:

1. A microscope (10) for detecting images at an image plane (16) of an object (14) located in an object plane (12), comprising:
a microscope stand (18);
a microscope objective (20);
an observation beam path between the object plane (12) and the image plane (16), the observation beam path having an axis (13);
a light source (22) providing incident illumination, wherein the light source (22) is integrated into the microscope stand (18);
an illumination beam path between the light source and the object plane, the illumination beam path having an axis (15);
a beam splitter (24), integrated into the microscope objective (20), for coupling in the incident illumination so that the illumination beam path and the observation beam path are at least partially coaxial; and
a refractive element (28) is integrated into the microscope objective (20), a portion of the microscope objective (20) facing toward the object plane (12) being arranged in the observation beam path between the object plane (12) and the image plane (16), and in the illumination beam path between the light source (22) and the object plane (12), the refractive element (28) integrated into the microscope objective (20) being arranged in front of the beam splitter (24) in the illumination direction, and in the illumination beam path between the light source (22) and the object plane (12) in a portion of the microscope objective (20) facing toward the light source (22), such that an illumination aperture corresponds to an objective aperture of the microscope objective (20).

2. The microscope according to claim 1, wherein the beam splitter (24) integrated into the microscope objective (20) is arranged in an observation beam path between the object plane (12) and an image plane (16) of the microscope (10), and in an illumination beam path between the light source (22) and the object plane (12), such that the light generated by the light source (22) is deflectable onto the object (14) located in the object plane (12).

3. The microscope (10) according to claim 1, wherein the beam splitter (24) is arranged relative to the light source (22) such that the light generated by the light source (22) is couplable laterally into the observation beam path, and the light couplable laterally into the observation beam path is deflectable onto the object (14) located in the object plane (12).

4. The microscope (10) according to claim 1, wherein a field diaphragm (30) and an aperture diaphragm are arranged in the microscope stand in the illumination beam path between the light source (22) and the object plane (12), such that a Köhler condition for illumination of the object (14) is satisfied.

5. The microscope (10) according to claim 1, wherein the light source (22) is imageable into a field plane and through the microscope objective (20) into the object plane (12), so that critical illumination of the object (12) is achievable.

6. The microscope according to claim 1, wherein the microscope objective (20) includes a plurality of objective lenses (40a-40d) arranged after the beam splitter (24) in an illumination direction of the illumination beam path, and a lambda/4 plate (26) arranged between several two of the plurality of objective lenses (40a-40d); wherein several objective lenses (40c, 40d) of the plurality of objective lenses are arranged after the lambda/4 plate (26) in the illumination direction and have respective lens surfaces that are embodied such that light reflected at the lens surfaces is deflected substantially out of the observation beam path.

7. The microscope (10) according to claim 1, wherein a contrasting element (36) is arranged in the microscope objective (20).

8. The microscope (10) according to claim 1, wherein an interface (48) is integrated into the microscope objective (20), for inserting different contrasting elements.

9. The microscope according to claim 1, wherein the microscope objective is a removable microscope objective (20) that is mountable on and demountable from the microscope stand (18).

10. A microscope objective (20) for use in a microscope (10), wherein the microscope (10) detects images at an image plane (16) of an object (14) located in an object plane (12) and the microscope (10) includes i) a microscope stand (18), ii) an observation beam path between the object plane (12) and the image plane (16), the observation beam path having an axis (13), iii) a light source (22) integrated into the microscope stand (18) for providing incident illumination, and iv) an illumination beam path between the light source and the object plane, the illumination beam path having an axis (15), the microscope objective (20) comprising:
a microscope objective housing (21);
several objective lenses (40a-40d) arranged in the objective housing; and
at least one beam splitter (24), integrated into the objective housing, constructed to provide incoupling of the incident illumination such that the illumination beam path of the microscope (10) and the observation beam path of the microscope (10) are at least partially coaxial;
wherein the microscope objective (20) further comprises a refractive element (28) integrated into the objective housing (21), a portion of the microscope objective (20) facing toward the object plane (12) being arranged in the observation beam path between the object plane (12) and the image plane (16), and in the illumination beam path between the light source (22) and the object plane (12), the integrated refractive element (28) being arranged in front of the beam splitter (24) in the illumination direction, and in the illumination beam path between the light source (22) and the object plane (12) in a portion of the microscope objective (20) facing toward the light source (22), the integrated refractive element (28) being constructed and located such that an illumination aperture corresponds to an objective aperture of the microscope objective (20).

11. The microscope objective according to claim 10, a plurality of the objective lenses are arranged after the beam splitter in the illumination direction, and wherein the objective further comprises a lambda/4 plate (26), the plate (26) being integrated into the objective housing such that the plate (26) is arranged between several objective lenses (40a-40d) arranged after the beam splitter (24) in the illumination direction.

12. The microscope objective according to claim 11, wherein the lens surfaces of the objective lenses (40c, 40d) that are arranged after the lambda/4 plate (26) in the illumination direction are embodied such that light reflected at the lens surfaces is deflectable substantially out of an observation beam path.

13. The microscope objective according to claim 10, wherein the microscope objective is a removable microscope objective (20) that is mountable on and demountable from a microscope stand (18).

14. A microscope system, comprising:
a microscope (10) for detecting images at an image plane (16) of an object (14) located in an object plane (12), the microscope comprising (i) a microscope stand (18), (ii) an observation beam path between the object plane (12) and the image plane (16), the observation beam path having an axis (13), (iii) a light source (22) providing incident illumination, wherein the light source (22) is integrated into the microscope stand (18), and (iv) an illumination beam path between the light source and the object plane, the illumination beam path having an axis (15),
a first microscope objective (20) removably mountable on the microscope stand and comprising i) a microscope objective housing (21), ii) several objective lenses (40a-40d) arranged in the objective housing and iii) at least one beam splitter (24), integrated into the objective housing, for incoupling of a coaxial coupling in the incident illumination so that the illumination beam path and the observation beam path are at least partially coaxial, wherein the first microscope objective (20) further comprises a refractive element (28) integrated into the objective housing (21), a portion of the microscope objective (20) facing toward the object plane (12) being arranged in the observation beam path between the object plane (12) and the image plane (16), and in the illumination beam path between the light source (22) and the object plane (12), the integrated refractive element (28) being arranged in front of the beam splitter (24) in the illumination direction, and in the illumination beam path between the light source (22) and the object plane (12) in a portion of the microscope objective (20) facing toward the light source (22), such that an illumination aperture corresponds to an objective aperture of the microscope objective (20), and
a second microscope objective (42) removably mountable on the microscope stand in exchange for the first microscope objective (20), the second microscope objective being beam-splitter-free,
wherein a working distance and/or a focal length of the microscope is longer when the beam-splitter-free second microscope objective (42) is mounted on the microscope stand than when the first microscope objective (20) comprising the beam splitter is mounted on the microscope stand.

\* \* \* \* \*